Jan. 22, 1924.

C. L. POST

ENVELOPE FEEDING MECHANISM

Filed Feb. 8, 1922

Witnesses:
Harry B. L. White
W. P. Kilroy

Inventor:
Claude L. Post
By Hill & Hill
Attys.

Jan. 22, 1924.

C. L. POST

ENVELOPE FEEDING MECHANISM

Filed Feb. 8, 1922

Witnesses:

Inventor:
Claude L. Post
By Hiee & Hiee
Attys.

Jan. 22, 1924. 1,481,557
C. L. POST
ENVELOPE FEEDING MECHANISM
Filed Feb. 8, 1922 5 Sheets-Sheet 3
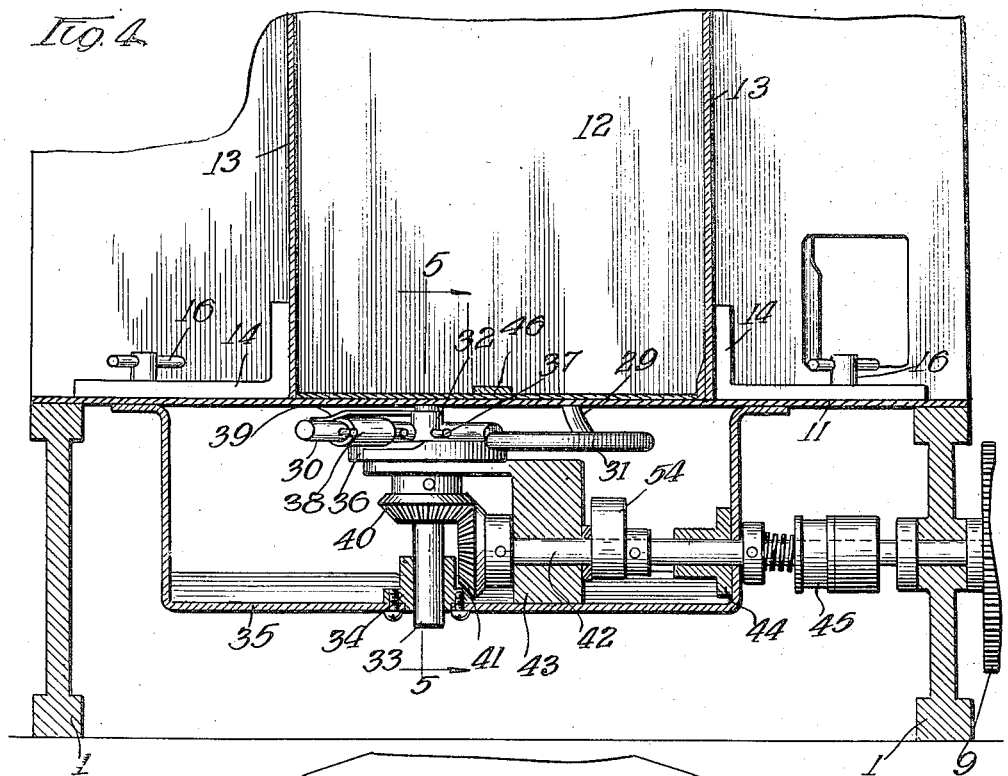
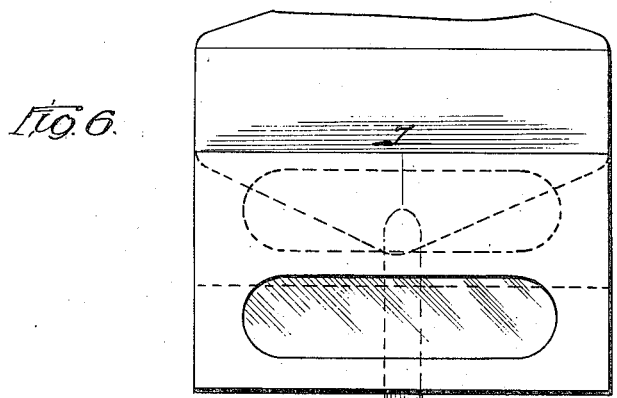
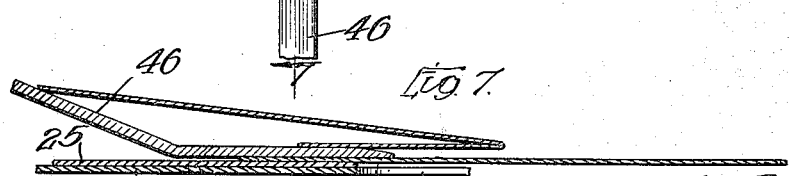
Witnesses: Inventor:
Claude L. Post
Attys.

Jan. 22, 1924.

C. L. POST

ENVELOPE FEEDING MECHANISM

Filed Feb. 8, 1922    5 Sheets-Sheet 4

1,481,557

Witnesses:
Harry C. White
W. P. Kilroy

Inventor
Claude L. Post
By Hiie & Hiie
Attys.

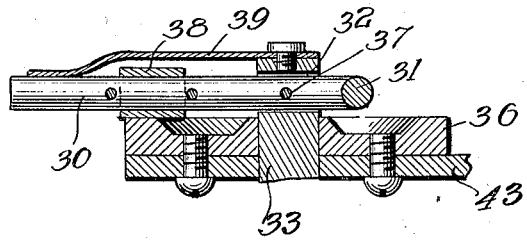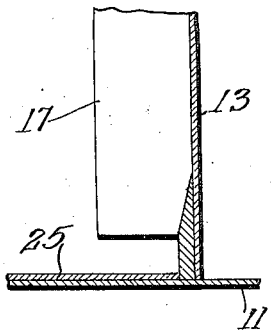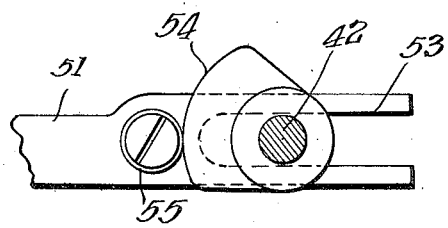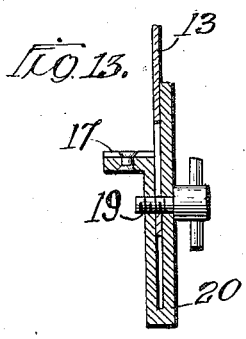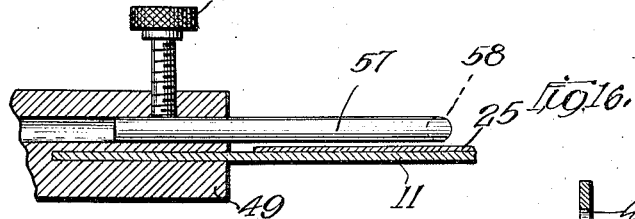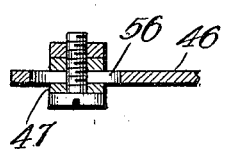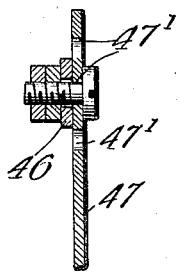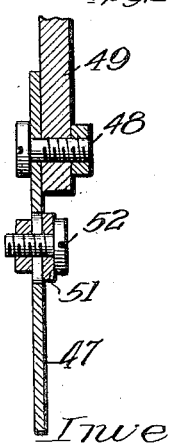

Patented Jan. 22, 1924.

1,481,557

UNITED STATES PATENT OFFICE.

CLAUDE L. POST, OF CHICAGO, ILLINOIS.

ENVELOPE-FEEDING MECHANISM.

Application filed February 8, 1922. Seral No. 534,892.

*To all whom it may concern:*

Be it known that I, CLAUDE L. POST, a citizen of the United States, residing at Chicago, in the county of Cook and State of Illinois, have invented certain new and useful Improvements in Envelope-Feeding Mechanism, of which the following is a description.

My invention relates to improvements in envelope feeding mechanisms, and more particularly to a device which will feed envelopes successively from a magazine to a pair of printing rolls or the like, each envelope as it is fed to said rolls having its flap opened or unfolded along the line of fold and extended in the direction of said rolls.

With certain types of envelopes, as for instance those having transparencies or windows therein, the window of the bottom envelope in the magazine is apt to catch or engage the flap of the envelope immediately thereabove, so that the window is torn and the envelopes damaged. In order to overcome this possibility of damage, I have provided means to enter between the bottom envelope that is to be fed and the envelope immediately thereabove, so that the bottom envelope may be fed without having the flap of the upper envelope engage the window of the lower envelope.

The invention has among its other objects a device of the kind described which is simple, convenient, durable, reliable, efficient and satisfactory for use wherever found applicable.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts, Fig. 1 is a side elevation of my device as applied to a printing frame.

Fig. 4 is a section taken substantially on the line 4—4 of Fig. 1;

Fig. 6 is a top plan view of the envelopes in the magazine, with the bottom envelope being fed out of the stack;

Fig. 7 is a section taken substantially on the line 7—7 of Fig. 6;

Figs. 8 and 9 are sections similar to Fig. 7, showing successive steps previous to that shown in Fig. 7;

Fig. 10 is a section taken substantially on the line 10—10 of Fig. 3;

Fig. 11 is a section taken substantially on the line 11—11 of Fig. 3;

Fig. 12 is a section taken substantially on the line 12—12 of Fig. 2;

Fig. 13 is a section taken substantially on the line 13—13 of Fig. 1;

Fig. 14 is a section taken substantially on the line 14—14 of Fig. 2;

Fig. 15 is a section taken substantially on the line 15—15 of Fig. 1;

Fig. 16 is a section taken substantially on the line 16—16 of Fig. 1, and

Fig. 17 is a section taken substantially on the line 17—17 of Fig. 1.

Figure 1:
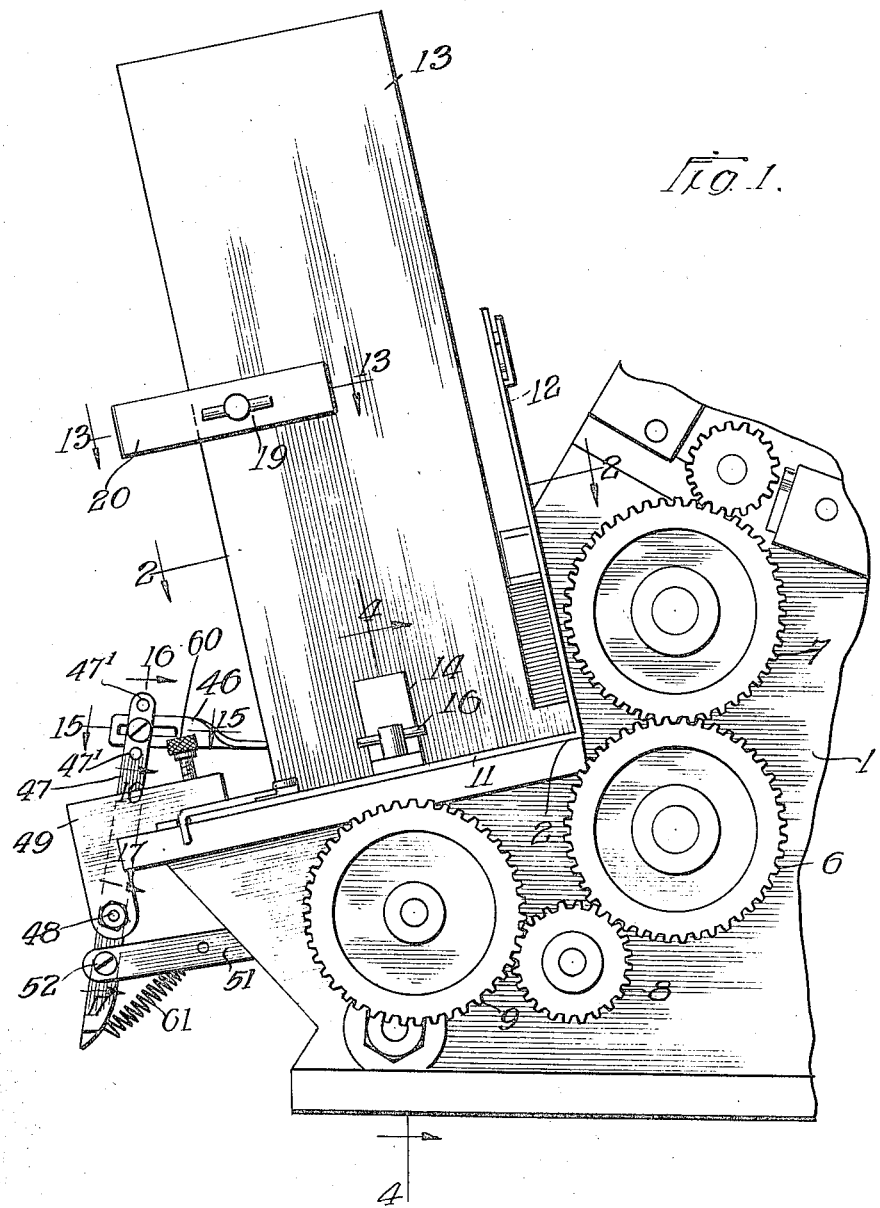

In the drawings, wherein I have shown the preferred embodiment of my invention, 1 indicates the side frames of a printing press or the like, that are cut away or shouldered as at 2 to provide a recess for receiving the detachable, removable envelope feeding mechanism. 3 and 4 indicate printing rolls adapted to receive envelopes therebetween, and to discharge said envelopes in any suitable manner after they have been printed, said printing rolls having cooperating inking rollers 5 in operative contact therewith. Gears 6 and 7 at the ends of the printing rolls 3 and 4 respectively are in mesh with each other so as to drive the rolls 3 and 4, synchronously, said rolls 5 and 6 intermeshing with an idler gear 8, which in turn drives a gear 9, said gear 9 being of the same size as gear 6, so that the feeding mechanism will drive at the same speed as the printing rolls.

Figure 2:
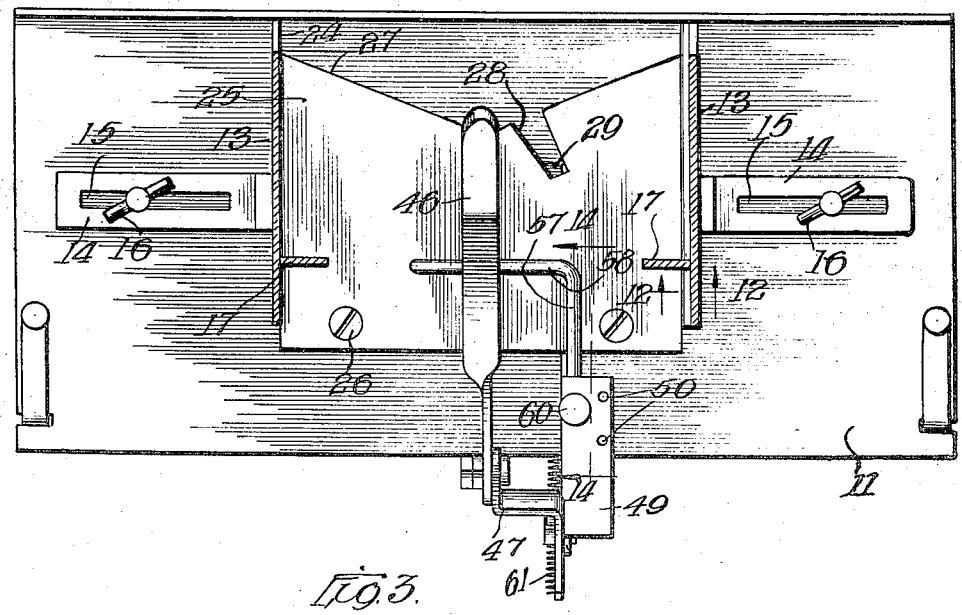
Fig. 2 is a section taken substantially on the line 2—2 of Fig. 1.
Figure 3:
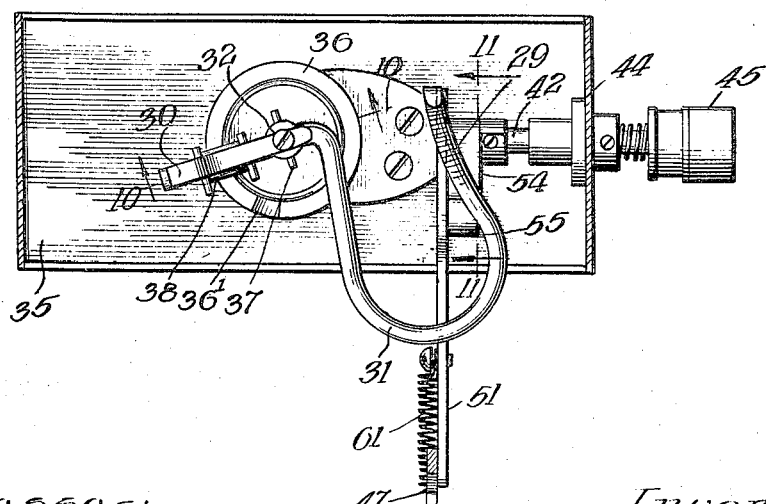
Fig. 3 is a section taken substantially on the line 3—3 of Fig. 5.
Figure 5:
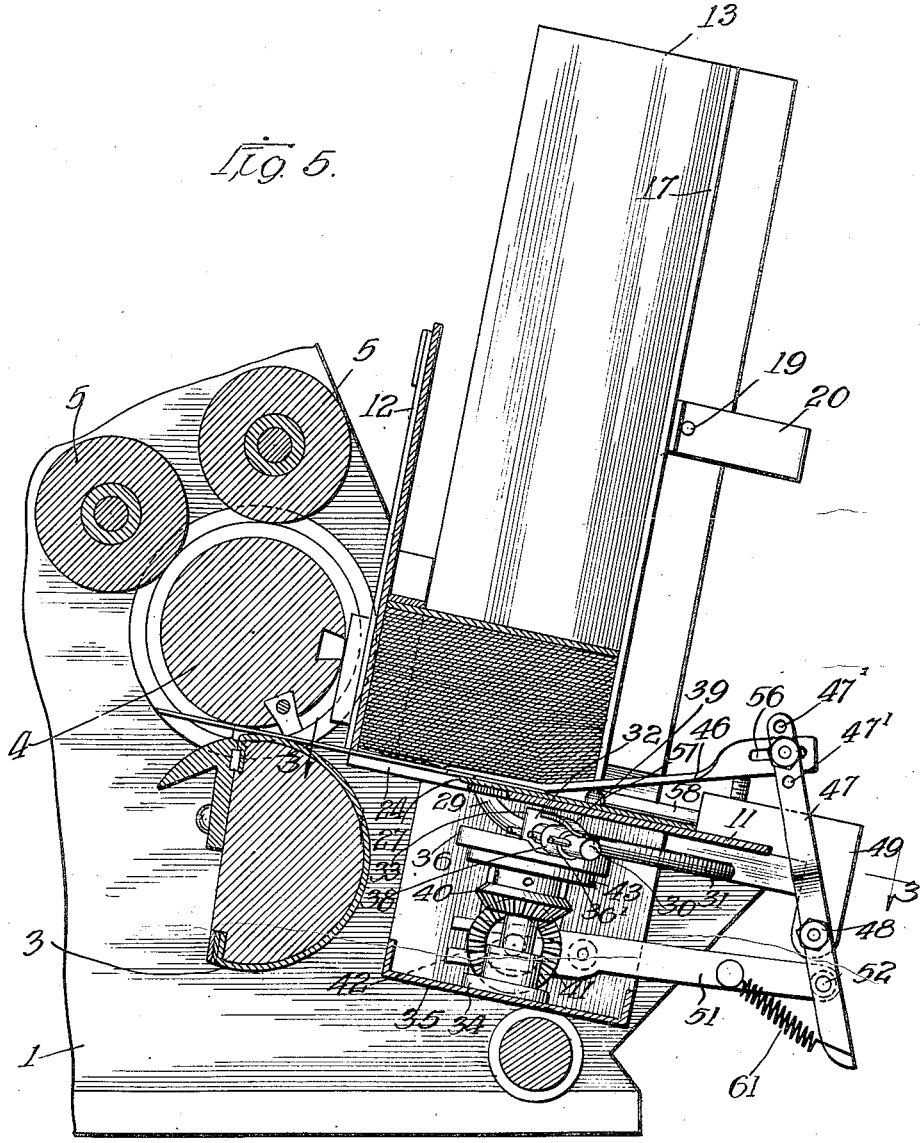
Fig. 5 is a section taken substantially on the line 5—5 of Fig. 4.

The magazine for the envelopes comprises a base or bottom plate 11 and an end wall 12, there being side walls 13 adjustably positioned thereon so that the magazine may receive any size of envelopes therein. Angle irons 14 are provided at the base of the side walls 13, said angle irons having elongated slots 15 therein adapted to receive fastening means 16 therethrough, whereby said side walls may be adjustably positioned on the bottom plate 11. For the purpose of adjusting the magazine to accommodate the various widths of envelopes, I have provided adjustable wall members 17, as shown in Figs. 2 and 5, said wall members 17 being slidably mounted on the side walls 13, as shown, said side walls having elongated slots therethrough, each adapted to receive a threaded extension 19 which passes through a return-bend strap member 20 secured to the member 17 and engaging both sides of the wall members 13. Thus it is seen that the magazine or envelope receptacle may be adjusted for various lengths of envelopes by means of the adjustable sides 13 and for various widths of envelopes by the adjustable wall members 17.

The bottom plate 11 is cut away where it meets the wall 12, as at 24, to form the recess for receiving the envelope flap so that the envelopes may pass outwardly from the magazine through said opening. Guide plates 25 of various sizes are adapted to be detachably secured to the bottom plate 11 by screws 26 or the like, said plates having their inner edges cut away as at 27 to form recesses for the envelope flaps, each plate 25 having a slot 28 therein transversely of and communicating with the opening 27, said opening 28 being adapted to receive a flap-engaging finger 29, which will be hereinafter more fully described.

The finger 29, which is rotatably driven, is formed of a rod having a return-bend or U-shaped portion 30 and a leg portion 31 offset laterally of one of the legs of the U portion. The offset portion 31 is passed through an elongated radial aperture 32 near the outer end of a shaft 33, said shaft being journaled in a bearing sleeve 34 or the like, mounted adjacent the bottom of the frame 35 supporting the drive mechanism. A stationary cam disk 36 loosely encircles shaft 33 adjacent its upper end, said cam disk having a cam way with a depression 36' on its upper surface. The flap-engaging finger is pivoted to the shaft 33 by a radial pivot pin 37, so that the finger is driven by the shaft, and a roller 38 is revolubly mounted on the offset part 30 in engagement with the cam surface of the cam disk 36. A spring 39 presses the roller in engagement with the cam disk so that when the finger is drivingly rotated by the shaft and the roller 38 is pressed in the recess 36' of the cam face, the finger will tilt in a vertical plane about the pivot pin 37 so that its end 30 will move downwardly and the finger tip or end 29 will move upwardly into the slot 28, where it engages between the closed end and flap of the lower or bottom envelope in the magazine, and as the finger continues to rotate, it opens or extends the flap outwardly in the direction of the printing rolls.

A bevel gear 40 is secured to the shaft 33 and meshes with a bevel gear 41 secured at the end of a drive shaft 42, the shaft 42 being mounted in bearings 43 and 44, and having a detachable drive coupling 45 at its outer end. The bearing 43 carries the stationary cam or disk member 36 just described, as shown more clearly in Figs. 4, 5 and 10.

With envelopes of the type having transparencies or windows in their front faces it is difficult to feed the bottom envelope of the pile or stack without having its window engaged by the flap of the adjacent superimposed envelope as it is moved past the stack. In order to overcome this objectionable tendency, I have provided a second finger 46, pivotally mounted at its upper end to an upright lever 47, said finger bent so as to extend downwardly and toward said stack. The lever 47 is mounted between its ends, as at 48, to a stationary member 49 having a bottom-plate receiving slot therethrough so that it may be adjustably secured to the bottom plate 11 by any suitable means, as by set screws 50, as shown in Fig. 2. An arm 51 is pivotally secured at its end 52 to the lever 47, below the pivotal connection 48, the arm 51 having a yoked inner end as at 53, so that it slidably engages on opposite sides of the drive shaft 42 at right angles thereto, as shown in Figs. 5 and 9.

The drive shaft 42 carries a cam 54, and at the inner end of the arm 51 there is secured a cam roller 55 adapted to be engaged by the cam 54 to move the arm 51 backward so as to actuate the lever arm 47, which in turn carries the finger 46. The finger 46 has a slot 56 at its pivotal connection with the upper end of the arm 47, and the arm 47 has a series of pivot pin receiving apertures 47' so that adjustment of the finger 46 is provided relative the stack of envelopes.

A member having legs 57—58 at right angles to each other and adapted to rest on the bottom plate 11 of the frame, as shown more clearly in Figs. 2 and 14, extends slidably in a slot in the part 49, as shown in Fig. 14, and is adjustably held therein by a set screw 60, so that it may be adjusted vertically and laterally of the envelopes in the stack. Thus the freely pivotal finger 46 will be supported by and slide or ride over the leg 57 immediately before dropping to the bottom, adjustment being permitted by the set screw 55, whereby the leg 57 which slidably supports the finger 46 may be held in various vertical positions, as shown.

A spring 61 is secured to the lower free end of the lever 47 so as to return the finger 46 away from the envelopes after the bottom envelope has been fed, and also to maintain the cam roller 55 in engagement with the cam 54.

In operation, the finger 46 rests on the leg 57 off the bottom of the magazine and under the edge of the envelopes in the stack as in Fig. 8. The bottom envelope is fed out of the magazine, the rear edge dropping off the end of the finger, and while being fed, the finger 46 is moved forward faster than the travel of said bottom envelope, moving slightly upwardly (see Fig. 9). The finger slides off the leg 57 and drops (by gravity, aided by the weight of superimposed envelopes) on the bottom envelope, (see Figs. 5, 6 and 7), moving thereon until it comes directly below the edge of the flap of the superimposed envelope, and rests there until the bottom envelope is out of the magazine, whereupon the finger is returned automatically to its normal position. The movement of the finger 46 is therefore forwardly, first upwardly and then downwardly, and thence moved backwardly.

It is seen that both the fingers 29 and 46 are driven in unison through the same driving mechanism and are operative at predetermined intervals.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a device of the kind described and in combination, an envelope magazine, means for feeding the bottom envelopes successively from said magazine laterally of the remaining envelopes, independently movable means insertable between said bottom envelope and the envelope immediately thereabove while said bottom envelope is being fed, and drive means for actuating both of said means in a predetermined manner.

2. In a device of the kind described and in combination, an envelope magazine, means for feeding the bottom envelopes in succession from the magazine, a finger movably insertable between said bottom envelope and the envelope immediately thereabove to prevent the flap of the last-mentioned envelope from catching in the bottom envelope while said bottom envelope is being fed, and means for slidably engaging and supporting said finger.

3. In a device of the kind described and in combination, an envelope magazine, means for feeding the bottom envelopes in succession from the magazine, a finger movably insertable between said bottom envelope and the envelope immediately thereabove to prevent the flap of the last-mentioned envelope from catching in the bottom envelope while said bottom envelope is being fed, a support for slidably supporting the inserting end of said finger, means for adjusting said support relative to the envelopes in the magazine, means for operably inserting said finger, and drive means actuating both said last mentioned means and feeding means at predetermined intervals.

4. In a device of the kind described and in combination, an envelope magazine, means for feeding the bottom envelopes successively from the magazine, a finger movable independently of said means and slidably insertable between said bottom envelope and the envelope immediately thereabove while said bottom envelope is being fed to lift the last-mentioned envelope from the bottom envelope, and means for operating both of said means in unison.

5. In a device of the kind described and in combination, a frame, an envelope magazine thereon, means for feeding the bottom envelopes successively from said magazine, a finger pivoted to move in a vertical plane and adapted to have one end slidably supported adjacent the stack of envelopes in the magazine, drive means for operating said feeding mechanism, and means operated by said drive means to move said finger slidably across its support so that it is inserted between the bottom envelope and the envelope immediately thereabove.

6. In a device of the kind described and in combination, a frame, an envelope magazine thereon, means for feeding the bottom envelopes successively from said magazine, a lever pivotally mounted to a stationary part of the device, a finger pivoted to said lever in a vertical plane and adapted to have one end slidably supported adjacent the stack of envelopes in the magazine, an arm pivotally connected to said lever, drive means for operating said feeding mechanism, and a cam operated by said drive means engageable with said arm to move said finger slidably across its support so that it is inserted between the bottom envelope and the envelope immediately thereabove.

7. In a device of the kind described and in combination, a frame, an envelope magazine thereon, means for feeding the bottom envelopes successively from said magazine, a lever pivotally mounted to a stationary part of the device, a finger pivoted to said lever in a vertical plane and adapted to have one end slidably supported under the rear edge of the stack of envelopes in the magazine, means for vertically adjusting the slidably supported end of said finger, an arm pivotally connected to said lever, drive means for operating said feeding mechanism, and a cam operated by said drive means and engageable with said arm to move said finger slidably across its support in unison with the operation of the feeding means and insert it between the bottom envelope and the envelope immediately thereabove.

8. In a device of the kind described and in combination, a frame, an envelope magazine therein, means for feeding the bottom envelopes successively from said magazine, a lever pivotally mounted to a stationary part of the device, a finger pivoted at one end to said lever so as to move in a vertical plane and adapted to have its other end slidably suported adjacent the stack of envelopes in the magazine, means arranged between the frame and the finger for vertically adjusting the slidable support of the finger, an arm pivotally connected to said lever, drive means for said feeding mechanism, a cam carried by said drive means and operably engageable with said arm to pivot said lever to move said finger so that it slides across said support and drops between the bottom envelope and the envelope immediately thereabove, and means for automatically returning said finger to its inoperative position after each bottom envelope is fed.

9. In a device of the kind described and in combination, a frame, an envelope magazine therein, means for feeding the bottom envelopes successively from said magazine, a lever pivotally mounted to a stationary part of the device, a finger pivoted in a vertical plane at one end to said lever and extending downwardly and toward said envelopes and adapted to have its other end slidably supported adjacent the stack of envelopes in the magazine, whereby the finger will enter between the envelopes of the stack and lift the envelopes above the bottom one, means arranged between the frame and the finger for vertically adjusting the slidable support of the finger, an arm pivotally connected to said lever, drive means for said feeding mechanism, a cam carried by said drive means and operably engageable with said arm to pivot said lever to move said finger in unison with said feeding mechanism so that it slides across said support and enters between the bottom envelope and the envelope immediately thereabove, and means for automatically returning said finger to its inoperative position after each bottom envelope is fed.

10. In a device of the kind described and in combination, an envelope magazine, a finger insertable between the flap and body of successive bottom envelopes and movable along said flaps to extend them from said magazine, said finger having a U-shaped flap-engaging portion, with a leg offset transversely at the end of one of the legs of the U-shaped portion, a drive shaft having an elongated aperture therethrough adapted to receive said laterally offset portion therethrough, a pivot pin through said shaft and offset portion so that said finger may pivot in said aperture in a vertical plane, a stationary cam having a cam face engageable with said laterally offset portion, a spring pressing said portion toward said cam surface whereby said finger will be tilted upwardly when said portion engages a depression of said cam surface so that the bottom envelope will be engaged between its flap and bottom by said finger, and means for operating said drive shaft.

11. In a device of the kind described and in combination, an envelope magazine, a finger insertable between the flap and body of successive bottom envelopes and movable along said flaps to exend them from said magazine, said finger having a U-shaped flap-engaging portion, with a leg offset transversely at the end of one of the legs of the U-shaped portion, a drive shaft having an elongated aperture therethrough adapted to receive said laterally offset portion therethrough, a pivot pin through said shaft and offset portion so that said finger may pivot in said aperture in a vertical plane, a stationary cam having a cam face engageable with said laterally offset portion, a spring pressing said portion toward said cam surface whereby said finger will be tilted upwardly when said portion engages a depression of said cam surface so that the bottom envelope will be engaged between its flap and bottom by said finger, means insertable between the bottom envelope and the envelopes immediately thereabove, while said bottom envelope is being fed, and means for operating both said last mentioned means and said drive shaft in a predetermined manner.

12. In a device of the kind described and in combination, an envelope magazine, a finger insertable between the flap and body of successive bottom envelopes and movable along said flaps to extend them outwardly from said magazine, said finger having a U-shaped flap-engaging portion with a leg offset transversely at the end of one of the legs of the U-shaped portion, a drive shaft having an elongated aperture therethrough adapted to receive said laterally offset portion therethrough, a pivot pin through said shaft and offset portion so that said finger may pivot in said aperture in a vertical plane, a roller carried by said laterally offset portion, a stationary cam having a cam face engageable with said roller, a spring pressing said roller toward said cam surface whereby said finger will be tilted upwardly when said roller engages a depression of said cam surface so that the bottom envelope will be engaged between its flap and bottom by said finger, and means for operating said drive shaft.

In testimony whereof, I have hereunto signed my name in the presence of two subscribing witnesses.

CLAUDE L. POST.

Witnesses:
B. V. ZILLMAN,
H. C. JACOBS.